2,780,620
Patented Feb. 5, 1957

2,780,620
PARTIAL ACIDIC HYDROLYSIS OF STEROIDAL SAPONINS

Merle M. Krider, Philadelphia, and Monroe E. Wall, Oreland, Pa., assignors to the United States of America as represented by the Secretary of Agriculture No Drawing. Application January 28, 1954,
Serial No. 406,906

2 Claims. (Cl. 260—210.5)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention relates to steroidal saponins and to improved methods of recovering such saponins and the sapogenins contained therein from plant extracts.

By steroidal saponins we mean compounds having the following molecular skeleton

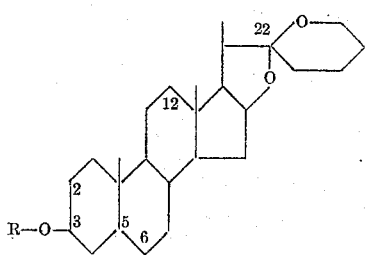

wherein R represents a side chain made up of two or more sugar moieties and the rest of the formula represents the skeleton of a steroidal sapogenin. Hydroxyl or carbonyl groups may be present at positions 2, 6 or 12 while isomers may occur through variations in the spatial configurations at positions 5 and 22.

Steroidal saponins are typically water-soluble while the corresponding sapogenins are highly insoluble. Accordingly, the usual method for recovery of such sapogenins from plant tissue is to extract the saponin from the tissue with water or an aqueous solvent, hydrolyze the saponin by prolonged boiling with strong acid (2 normal or stronger), and then recover the liberated sapogenin which is precipitated. The greatest objection to this procedure is that large volumes of water are required for extraction of the saponin so that in the acid hydrolysis step either an excessive amount of acid is required to achieve the necessary acid strength or else the solution must be extensively concentrated—a tedious and expensive operation. Another objection is that in the prolonged boiling of the highly acidified saponin solution great quantities of resins, tars, plant pigments and other extraneous matter are precipitated along with the desired sapogenin, making recovery and purification of the latter extremely difficult.

It is an object of this invention to provide an improved process for recovering steroidal sapogenin from plant tissue. Another object is to provide a convenient and economical method for partially hydrolysing the sugar side-chain of steroidal saponin, thus to obtain a saponin having a shortened sugar side-chain and which is insoluble in water. Still another object is to provide water-insoluble partially hydrolyzed steroidal saponins useful as intermediates in the preparation of steroidal sapogenins.

In our copending application entitled "Partial Enzymatic Hydrolysis of Steroidal Saponins," filed January 28, 1954, Serial No. 406,907, we pointed out the obvious disadvantages of the currently used strong acid hydrolysis method of obtaining steroidal sapogenins from plant extracts containing the corresponding saponins, and disclosed an improved method. This improvement consisted of an enzymatic partial hydrolysis of the saponin whereby the latter was rendered insoluble in water. The partially hydrolyzed saponin was then easily recovered and further hydrolyzed to yield the sapogenin. Unfortunately, this improved process was found to be applicable only to the recovery of sarsasapogenin from Yucca plant tissue.

We have now discovered a process for the partial hydrolysis of steroidal saponins to produce water-insoluble saponins having shortened sugar side-chains, which process is of general application to all the water soluble steroidal saponins that occur in Yucca, Agave or Dioscorea species.

According to the invention, aqueous extracts of the plant tissue, containing the saponin, are acidified to about pH 1 to 2 and heated, preferably at about the boiling point, until partial hydrolysis and precipitation of saponin occurs. The partially hydrolyzed saponin is then recovered, as by decantation, filtration or centrifuging, and may be readily hydrolyzed further to sapogenin by conventional methods. This process has two principal advantages over the conventional one-step, strong acid hydrolysis: (a) formation of large amounts of resins, tars and other solids, which heavily contaminate the product of the conventional process, is avoided, thus enormously simplifying the purification of the sapogenins produced; and (b) a great saving in reagent cost is achieved because the amount of acid required to acidify the plant extract to pH 1–2 is only 5 to 10% of the amount required to produce the 2-normal solution used in the conventional process.

The following examples illustrate the practice of our invention.

Example I

Three kg. of freshly ground leaves of *Yucca schidigera* were mixed with 6 l. of water, pressed in a cider press, reextracted with 3 l. of water and again pressed. The combined extract was clarified by centrifuging and saponin content was determined by extracting an aliquot with butanol and hydrolyzing the extracted saponin by boiling 4 hours in 2-normal hydrochloric acid.

The aqueous extract was divided into two parts, one of which was acidified to pH 1.5 and the other to pH 1.0 with hydrochloric acid. Each was then refluxed 2 hours, after which the precipitated saponin was recovered by centrifuging and was further hydrolyzed by boiling 4 hours in 2-normal hydrochloric acid. The sapogenin thus produced from the two portions amounted to 85 to 88%, respectively, of the amount present in the original portion, as determined in the aliquot analyzed by the conventional procedure. The product in each case was of high quality and required no further purification.

Example II

Freshly ground leaves of *Yucca baccata* were extracted with water and the sapogenin content of the extract determined as in Example I.

The aqueous extract was divided into two portions and each was acidified to pH 1.4, hydrochloric acid being used in the first and sulfuric acid in the second. Each portion was then refluxed 4 hours, after which the partially hydrolyzed saponin was recovered and further hydrolyzed as in Example I. The yields of pure sapogenin from the two portions were 90 and 84%, respectively, of that shown to be present by the conventional procedure.

Example III

Freshly ground leaves of *Agave fourcroyoides* were extracted as in Example I. The extract was acidified to pH 1.0 with hydrochloric acid and then refluxed 2 hours. The precipitated partially hydrolyzed saponin was further hydrolyzed and the resulting sapogenin recovered as in Example I. The yield was 88% of that of the conventional procedure.

By proceeding substantially as in the preceding examples, the water-soluble saponins of *A. ferox, A. toumeyana, Y. elata, Dioscorea composita, D. macrostachya,* and various unidentified species of Yucca and Dioscorea were extracted from the plant tissue; partially hydrolyzed, thus rendering them insoluble in water; separated from the aqueous extract; and further hydrolyzed by the conventional strong acid procedure to produce high yields of pure sapogenins.

The process of the invention is especially useful for processing saponins yielding on hydrolysis sarsasapogenin, smilagenin, hecogenin, tigogenin, manogenin, gitogenin and diosgenin.

We claim:

1. A process for partially hydrolyzing a water-soluble steroidal saponin extracted from a plant of the group consisting of Agaves, Yuccas and Dioscoreas, whereby said saponins are rendered substantially insoluble in water, comprising acidifying a dilute aqueous solution of the saponin with a strong mineral acid to a pH of about 1 to 2, to partially hydrolyze a substantial portion of the saponin present, thus rendering it insoluble in water as a precipitate, and recovering the thus precipitated partially hydrolyzed saponin.

2. A process for obtaining steroidal sapogenin from the tissue of a sapogenaceous plant of the group consisting of Agaves, Yuccas and Dioscoreas comprising extracting the plant tissue with water, thus to dissolve the saponins, acidifying the aqueous extract with strong mineral acid to a pH of about 1 to 2 to partially hydrolyze a substantial portion of the saponin, thus rendering it insoluble in water as a precipitate, recovering the precipitated partially hydrolyzed saponin and completing its hydrolysis by boiling for several hours in aqueous strong mineral acid of about 2 normality, and recovering the thus formed steroidal sapogenin.

References Cited in the file of this patent

UNITED STATES PATENTS 2,069,687    Stoll et al. _____ Feb. 2, 1937

OTHER REFERENCES

Rothman et al.: J. Am. Chem. Soc., 74, 4013–6 (1952).
Sanchez-Marroquin et al.: Chem. Abs. 47, 6600 (1953).